Figure 1:
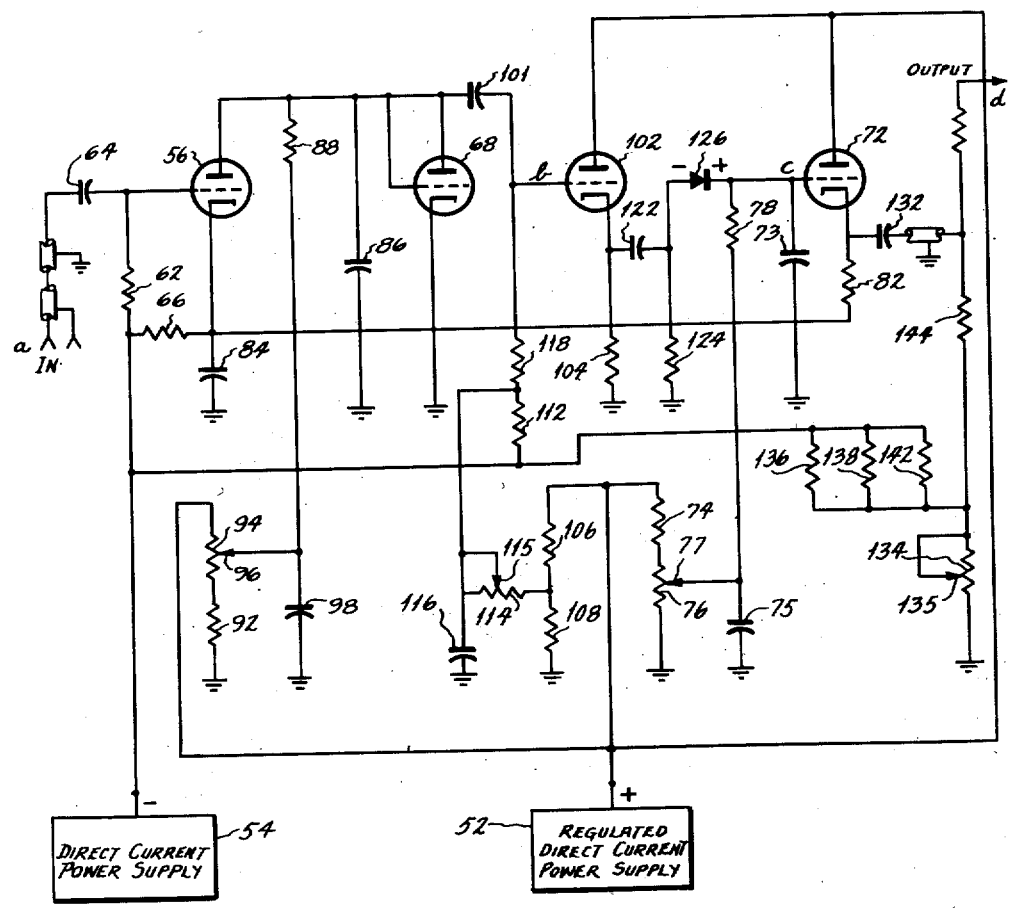

July 9, 1957     P. SCHOLZ     2,798,949

SENSITIVITY TIME CONTROL CIRCUIT

Filed June 11, 1954     2 Sheets-Sheet 1

INVENTOR.
PAUL SCHOLZ
BY *George Lipkin*
*Lee J. Hintzberger*
ATTORNEYS

July 9, 1957 P. SCHOLZ 2,798,949
SENSITIVITY TIME CONTROL CIRCUIT
Filed June 11, 1954 2 Sheets-Sheet 2

INVENTOR.
PAUL SCHOLZ
BY George Sipkin
Lee T. Huntzberger
ATTORNEY

United States Patent Office 2,798,949
Patented July 9, 1957

2,798,949

SENSITIVITY TIME CONTROL CIRCUIT

Paul Scholz, Woburn, Mass., assignor, by mesne assignments, to the United States of America as represented by the Secretary of the Navy Application June 11, 1954, Serial No. 436,267

3 Claims. (Cl. 250—27)

This invention relates to a sensitivity time control and more particularly to a sensitivity time control apparatus for use in echo-ranging system receivers for reducing receiver sensitivity to echoes at short ranges so that clutter return cannot cause saturation of the receiver.

This invention is particularly useful in echo-ranging systems such as radar and is adapted to be incorporated into the receiver portion of such systems. Radar receivers generally operate on the superheterodyne principle. Where this invention is incorporated into a radar receiver, it is adapted to minimize receiver sensitivity to the sea-return echo or the echo from other natural obstacles at close range.

Clutter return from the sea, or from near-by natural obstacles is often of sufficient strength to saturate the radar system. In this case, echoes from desired targets, at comparable positions, even if stronger than the clutter return, will be missed since the receiver is already saturated. The function of sensitivity time control is to reduce the receiver sensitivity, at short ranges, so that clutter return cannot cause saturation, and consequently, to allow the detection of desired targets at short ranges whose echoes are comparable in strength to that of the clutter return. Unfortunately, desired target echoes which are weaker than the clutter return and position coincident, will not be detected even with the use of sensitivity time control.

The sensitivity time control acts to perform this function by increasing the signal cutoff level of the receiver. In other words, only that portion of the signal voltage input to the receiver which exceeds the cutoff level causes any indication to appear on the indicator. Contrast is increased on the indicator and the target is made more distinguishable as compared to natural obstacles when both are at close range. This invention is active for a period of time corresponding to a predetermined target distance from the echo-ranging system, following the initiation of a transmitted pulse from the system. This invention acts to drive the bias on one or more intermediate frequency stages of the receiver in a negative sense to a controllable extent and for a controllable period of time following the initiation of a radiated pulse.

This circuit of this invention, is applicable to any control grid, gain-controlled amplifier so long as the load time-constant is small compared to the total time of the sensitivity time control voltage waveform. This precaution is necessary to preserve the desired shape of the sensitivity time control voltage waveform.

This invention generally includes a generator stage which is adapted to be triggered by the synchronizer of the echo-ranging system. A clamper is connected to the output of the generator stage and performs the first step in the pulse shaping operation. It serves for determining the flat time of the pulse and for precluding any positive overshoots on the negative voltage pulse generated by the generator stage. A shaper stage and an output stage in succession follow the generator stage of the sensitivity time control. Each stage includes an adjustment means which acts independently of all the other adjustment means for varying the characteristics of the output pulses obtainable from the invention. All adjustments affect only direct current supply voltage and not video (signal) voltages. Characteristics such as pulse duration, amplitude and recovery rate are controllable by the adjustment means.

The merit of this particular circuit is that all adjustments are independent of one another (do not interact) and further, that since all adjustments affect only direct current supply voltages, and not video (signal) voltages, the controls may be located remote from the remainder of the circuit.

An object of this invention is to provide sensitivity time control.

A further object is to provide a novel sensitivity time control apparatus for use in an echo-ranging system.

A further object is to provide an apparatus for reducing sensitivity of the receiver of an echo-ranging system to a predetermined extent and for a predetermined period following the initiation of a transmitted pulse from the echo-ranging system.

A further object is to provide a means for reducing echo-ranging system receiver sensitivity at close ranges in order to minimize the saturation effects of clutter echo returnable from natural obstacles at close ranges, whereby nearby targets whose echoes are comparable in strength to that of clutter return may be detected more readily.

A further object is to provide a sensitivity time control circuit wherein direct current supply voltages instead of video (signal) voltages are adapted to be adjusted.

A further object is to provide a sensitivity time control adjustable remote from the circuit proper.

Figure 3:
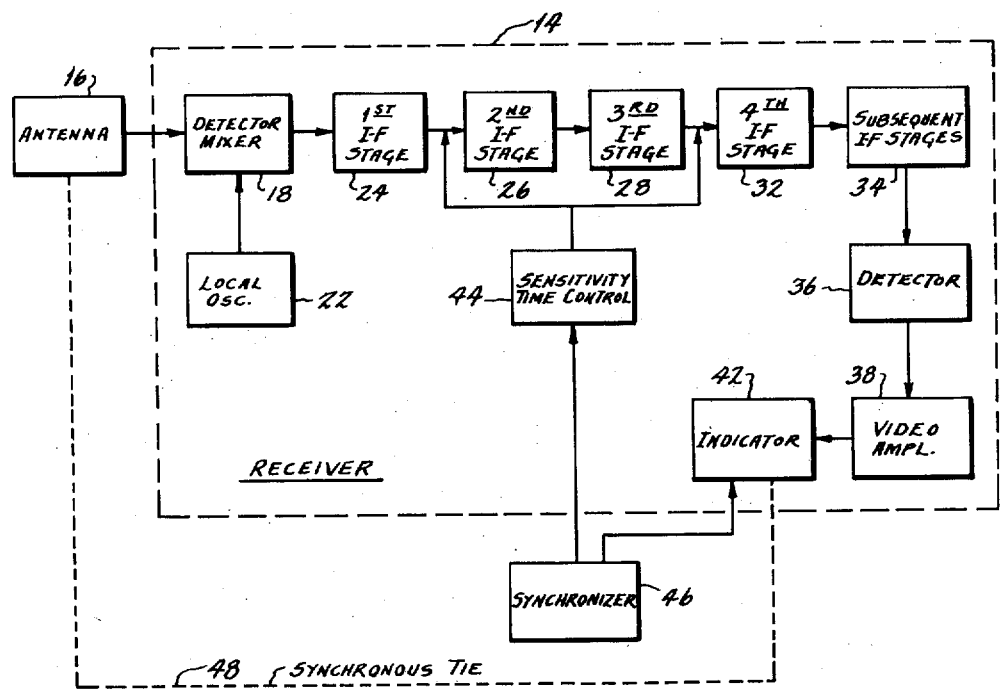
Figure 2:
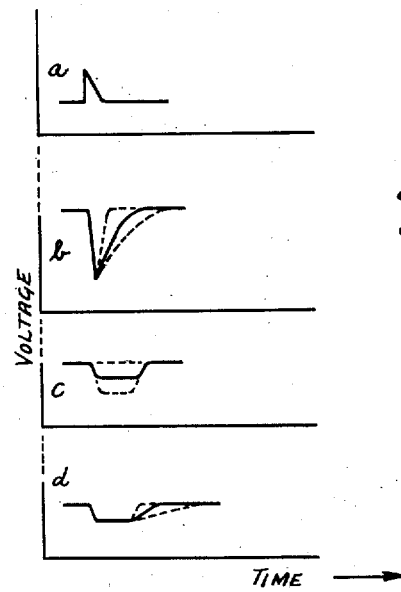

Other objects and many of the attendant advantages of this invention will be readily appreciated as the same becomes better understood by reference to the following detailed description when considered in connection with the accompanying drawings wherein:

Fig. 1 is a schematic diagram of a sensitivity time control according to a preferred embodiment of this invention, Fig. 2 includes a plurality of time-correlated graphical plots of voltage relative to time at various points in the circuit of Fig. 1 delineating quantitatively some operating conditions for values of parameters given in the description below, and Fig. 3 is a block diagram of a portion of a radar system showing the relationship of the sensitivity time control of this invention relative to the receiver of the radar system.

Pertinent portions only of a conventional radar system in combination with this invention are shown in block diagram form in Fig. 1. What is shown in Fig. 3 includes a receiver 14 connected to an antenna 16. The receiver 14 includes a detector-mixer 18, an associated local oscillator 22, a first intermediate frequency stage 24, a second intermediate frequency stage 26, a third intermediate frequency stage 28, a forth intermediate frequency stage 32, a plurality of subsequent intermediate frequency stages, 34, a detector 36, a video amplifier 38 and an indicator 42 such as a plan position indicator oscilloscope. The sensitivity time control 44 generates flattened negative-going voltage output pulses for application to the input end of the second intermediate frequency stage and the fourth intermediate frequency stage of the receiver. A synchronizer 46 associated with the transmitter portion, not shown, of the same echo-ranging system triggers the sensitivity time control 44 coincidentally with the initiation of a transmitted pulse from the associated transmitter. The synchronizer 46 further provides a trigger pulse to the indicator 42 to initiate a timing means in the indicator 42 in a conventional manner. A synchronous tie 48 links the indicator 42 to the antenna 16.

A preferred embodiment of the sensitivity time control circuit is described below with accompanying quantitative description, in parenthesis, immediately following each element. The quantitative description is not intended in a limited sense but is instead a more detailed description of one embodiment that operates satisfactorily. This circuit is adapted to use the existing power supplies of most conventional radar receivers. The power supplies referred to herein are presented in the interests of completeness, and not to indicate that this circuit necessarily requires separate power supplies.

The sensitivity time control circuit includes a regulated direct-current power supply 52 (275 volts) and a second regulated direct-current power supply 54 (105 volts). The power supplies 52 and 54 are of conventional design. They are oppositively connected in that the negative terminal of the power supply 52 is connected to a source of reference potential, indicated by the grounding symbol, whereas the positive terminal of the direct power supply 54 is connected to the same source of reference potential. The source of reference potential indicated by the grounding symbol is hereinafter referred to as ground. No filament power supply is shown for reasons of clarity. Information on the latter is obtainable from design handbooks. The circuit includes a generator triode 56 (½ 6SN7). Plate supply voltage for the generator triode 56 is provided by the power supply 54 in its cathode circuit. The control grid of the generator triode 56 is connected in series with a signal input resistor 62 (1.5 kilohms); the other end of resistor 62 is connected to the power supply 54. A signal (Fig. 2a) in the form of a positive voltage pulse from synchronizer 46 (Fig. 3) is adapted to be applied to the control grid of the generator triode 56 through the coupling condenser 64 (.0015 mfd.). The time constant of the coupling condenser 64 and the input resistor 62 is short and thus they serve to sharpen the triggering positive voltage pulses applied to the control grid of generator triode 56. The input triode 56 is normally cut off by current from another portion of the circuit flowing through the cathode bias resistor (2.2 kilohms) 66. The plate of the generator triode 56 is held clamped to ground by triode 68 (½ 6SL7) whose plate and control grid are connected to the plate of generator triode 56 and whose cathode is connected to ground. As a result, the plate voltage of triode 56 is equal to the terminal voltage of power supply 54 less the voltage drop in cathode bias resistor 66. As indicated in Fig. 2b the clamper tube actually determines the flat-time and thus performs the first step in the pulse shaping operation.

The current which flows through cathode bias resistor 66 for causing the generator triode 56 to be cutoff is the plate current of the output triode 72 (½ 6SN7). The plate of the output triode 72 is connected directly to the power supply 52. The bias potential for the control grid of the output triode is developed across a condenser 73 (120 mmf.) and is obtained from a voltage divider including a fixed resistor 74 (160 kilohms) and a potentiometer 76 (100 kilohms) having a movable tap 77. The voltage divider is connected directly across the power supply 52. A condenser charging resistor 78 (470 kilohms) is connected directly between the tap 77 and the control grid of the output triode 72. A load resistor 82 (24 kilohms) for the output triode 72 is connected directly between its cathode and the cathode bias resistor 66. Because of the positive bias on its grid the output triode 72 is normally conducting. Triode 72 operates in the linear region. Its plate supply voltage is equal to the sum of the terminal voltages of power supplies 52 and 54. The grid bias potential on the control grid of the output triode 72 with respect to ground is adapted to be varied between zero up to approximately two-fifths of the terminal voltage of the power supply 52. Normally, the potential of the cathode of the output triode 72, with respect to ground, is equal to the difference between the voltage developed across the resistors 66 and 82 due to its own current flow and the terminal voltage of the power supply 54. The basic effect of changing the position of the tap 77 of the potentiometer 76 is to change the charging rate of condenser 73. When the tap 77 is moved to a higher voltage position, the condenser 73 charges at a faster rate and, conversely, when the tap 77 is moved toward ground potential, the condenser 73 charges at a much slower rate. A discharge-charge cycle of the condenser 73 is initiated by an input trigger to circuit as described below.

A bypass condenser 84 (.01 mfd.) is connected between ground and the junction between the resistors 66 and 82. The condenser 84 serves to maintain the potential between the cathode of generator triode 56 and ground at a substantially constant level, notwithstanding change in current flow through the output triode 72 coincident with an input trigger pulse.

A condenser 86 (43 mmf.) is connected in parallel across the clamping triode 68. When a positive input trigger pulse is applied between the control grid and cathode of the generator triode 56, the condenser 86 is charged negatively via the generator triode 56 by the power supply 54 as the potential at the plate of the input triode drops below ground potential substantially instantaneously. As the instantaneous voltage of an input positive triggering pulse applied to the control grid of triode 56 drops back the generator triode 56 again becomes cutoff and the negatively charged condenser 86 begins to discharge toward the positive potential at the arm 96 of potentiometer 94. The discharge path for the condenser 86 includes a fixed resistor 88 (270 kilohms) and a voltage divider; the voltage divider is connected directly across the power supply 52. The voltage divider includes a fixed resistor 92 (10 kilohms) and a potentiometer 94 (100 kilohms). The potentiometer 94 has an adjustable tap 96. The tap 96 is connected to an end of resistor 88. A bypass condenser 98 (.1 mfd.) is connected between the tap 96 and ground. The discharge rate (Fig. 2b) is varied by means of tap 96. If the tap is moved in a positive direction the discharge rate is faster.

Previous to the application of a positive trigger pulse to the generator triode 56, the potential of the plate of the generator triode 56 with respect to ground and the potential across the condenser 86 are both zero. When an input positive triggering pulse (Fig. 2a) is applied to the control grid of the generator triode 56, the potential at the plate of the triode 56 drops sharply below ground potential, causing 86 to be negatively charged. Condenser 86 immediately starts to discharge through the resistor 88 and voltage divider 92–94 toward a positive reference level as determined by the setting of the tap 96 of potentiometer 94. The exponential voltage rise accompanying discharge of condenser 86 is prevented by the clamper triode 68 from proceeding above ground potential. However, adjustment of the tap 96 and thereby the positive reference level adjusts the rate of discharge and thus controls the duration of the pulse generated.

The generated pulse is coupled through a coupling condenser 101 (.01 mfd.) to the control grid of a shaper triode 102. Shaper triode 102 (½ 6SL7) is connected as a normally conducting cathode follower. Its plate is connected directly to the power supply 52. A loading resistor 104 (2.2 kilohms) is connected between the cathode of the shaper triode 102 and ground. Because the shaper triode 102 is normally conducting, its cathode is normally at a potential above ground.

A voltage divider comprising series connected resistors 106 (200 kilohms) and 108 (1.6 kilohms) are connected across the power supply 52. A resistor 112 (820 kilohms) and a variable resistance 114 (100 kilohms) are connected in series between the power supply 54 and the junction between the voltage dividing resistors 106 and 108. The bias applied to the control grid of the shaper tube 102 depends upon the amount of current flow in the resistor 112. The current flow in the resistor 112 is dependent upon the setting of the tap 115 of variable resistor 114. A bypass condenser 116 (0.1 mfd.) is connected between the tap of the variable resistance 114 and ground. The pulse that is generated at the plate of triode 56 is coupled into the control grid circuit of the shaper triode 102 and is developed relative to ground substantially entirely across the grid resistor 118 (1.2 megohms). The shaper triode 102 is driven beyond cutoff due to negative pulse developed across the grid resistor 118 to an extent determined by its bias voltage. This produces at the cathode of the shaper triode 102 a clipped negative-going pulse whose amplitude is controllable by the setting of the tap 115 of the variable resistance 114. The setting of the tap 115 determines the amount of current flow in the shaper tube 102 previous to cutoff and thereby determines the amplitude of the voltage developed across its cathode resistor 104. The length of the flat or plateau of the pulse developed across the resistor 104 is controlled by the setting of the tap 96 of potentiometer 94. As previously stated, the setting of the tap 96 determines the discharge rate of condenser 86 and thereby determines the time interval that elapses before the control grid of the shaper triode 102 again rises above cutoff to permit plate current to again flow through the shaper tube 102.

The voltage pulse developed across the resistor 104 of the shaper triode circuit is coupled into the grid circuit of the output triode 72 through the coupling condenser 122 (0.05 mfd.). The coupling condenser 122 permits the pulse developed in the shaper triode circuit to be developed across the grid resistor 124 (10 kilohms) in circuit with the control grid of the output triode 76. A crystal rectifier 126 (IN38) is connected between the grid resistor 124 and the control grid of the output triode 72. When a negative voltage pulse (Fig. 2c) is coupled from the shaper triode 102 to the grid resistor 124 there is electron current flow through the crystal rectifier 126 which discharges the previously charged condenser 73 driving the grid potential of the output triode 72 in a negative direction. The output triode 72 is cut off. The output triode remains cut off for a period of time that the shaper triode 102 is cut off. After the shaper triode 102 again conducts, the condenser 73 begins to charge, raising the bias above cut off and causing a rising current flow in the output triode 72; the time required for the condenser 73 to become charged is dependent upon the setting of the tap 77 as previously described. A bypass condenser 75 (0.1 mfd.) is connected between the tap 77 and ground. The output pulse developed across the load resistor 82 in the cathode circuit of the output triode 72 is adapted to be coupled into the bias circuits of one or more I. F. stages through a coupling condenser 132 (0.5 mfd.).

The bias for the control grids of the I. F. stages 26 and 32 is determined by the amount of current flow in the portion of the variable resistance 134 (5 kilohms) between ground and the tap 135. Parallel connected resistors 136, 138, and 142 (30 kilohms each) are connected in series between the tap 135 of the variable resistance 134 and the power supply 54. The output pulse (Fig. 2d) from the sensitivity time control 44 is added to the bias voltage. A fixed resistor 144 (3 kilohms) is connected between the coupling condenser 132 and tap 135 of the potentiometer. The output pulse is developed across the resistor 144 in series with the portion of the variable resistance 134 between the tap 135 and ground. If the tap 135 is at ground potential, the output pulse is developed entirely across the resistor 144.

In operation, the generator triode 56 is normally biased beyond cutoff and its plate is prevented from rising above ground potential by the clamper triode 68. Positive trigger pulses supplied from the synchronizer 46 are sharpened by the resistor 62 condenser 64 combination, and fed to the control grid of the generator triode 56 causing the triode 56 to conduct. The plate of triode 56 drops sharply to a negative potential with respect to ground, placing a negative charge on condenser 86; condenser 86 immediately starts to discharge through resistor 88 toward a positive reference potential determined by the adjustment of the variable voltage divider formed by resistor 92 and potentiometer 94 (flat control). Although the exponential voltage rise accompanying the discharge of condenser 86 is prevented by the clamper triode 68 from rising to a potential above ground, adjustment of the positive reference level by means of the tap 96 varies the rate of discharge of condenser 86 and thus controls the duration of the pulse coupled by condenser 101 to the control grid of the shaper triode 102 (Fig. 2b). The control grid of the shaper triode 102, a normally conducting cathode follower, is driven beyond cutoff by the pulse from the generator triode to an extent determined by its bias voltage; the bias voltage may be adjusted by means of the tap 115 (magnitude control). This produces at the cathode of the shaper triode 102 a clipped negative pulse whose magnitude and length of flat may be controlled by variable resistance 114 and potentiometer 94, respectively. The resultant output pulse from the shaper triode 102 is coupled by means of a coupling condenser 122 and a latching crystal rectifier 126 to the condenser 73 to produce a negative charge on condenser 73. This negative charge is held effectively constant during the flat portion of the waveform corresponding to the period during which the shaper triode 102 remains cut off. The function of the shaper triode can be best explained by reference to Figs. 2–b and 2–c. Fig. 2–b is the input waveform to the shaper while 2–c is the output waveform. The shaper triode is driven beyond cutoff by the negative pulse of Fig. 2–b thereby producing the flat plateau of Fig. 2–c in the output waveform. This plateau results in the I. F. sensitivity or gain being held at a constant decreased level for the very near ranges; in the absence of the shaper, (Fig. 2–b) the I. F. sensitivity would begin to increase immediately following the transmitted pulse. When the shaper triode 102 resumes conduction, its cathode goes to a potential above ground and current ceases to flow through the crystal rectifier 126. Crystal rectifier 126 prevents a return flow of current whereby the condenser 73 discharges through resistor 78 toward a positive reference potential as determined by the setting of the tap 77 of potentiometer 76 (duration control). As in the case of the generator triode circuit, variation of the voltage by means of the tap 77 changes the charge time of condenser 73 and thus controls the duration of the recovery part of the waveform appearing at the grid of the output triode 72 (Fig. 2b). This negative waveform is repeated at the cathode of the output triode 72 and is coupled by condenser 132 to the bias control circuit of intermediate frequency amplifier tubes in the stages 26 and 32. Positive trigger pulses are applied to the input of the sensitivity time control circuit coincident with each radiated pulse from an associated transmitter. The negative output pulses from the sensitivity time control serve in effect to reduce the receiver gain for echoes from nearby obstacles, the percentage reduction in gain for echoes from natural obstacles being greater than the percentage reduction in gain from targets under many circumstances. Careful adjustment of the sensitivity time control circuit is necessary since excessive attenuation will prevent detection of small close-in targets.

This circuit has possibilities for utilization in sonar systems without departing from the purview of this invention. Necessary design changes by one skilled in the art over the specific description given above involve adjusting time constants throughout the circuit to accommodate the longer repetition intervals used in sonar as a result of the lower velocity of propagation of the transmitted pulse and echo.

Obviously many modifications and variations of the present invention are possible in the light of the above teachings. It is therefore to be understood that within the scope of the appended claims the invention may be practiced otherwise than as specifically described.

I claim:

1. A pulse shaping circuit adapted for use as a sensitivity time control, said circuit comprising; a direct current power supply means having a first terminal defining a reference potential, a second terminal that is at a potential below the first terminal, and a third terminal at a potential above the first terminal; an input triode; a first resistance means connected between the control grid of said input triode and the second terminal of said power supply means; a second resistance means connected between the cathode of said input triode and the second terminal of said power supply means; a first condenser means having a first side connected to the anode of said input triode and having a second side connected to the first terminal of said power supply means; clamping means connected across said first condenser means for preventing said first condenser means from being charged to a potential above the reference potential; a first adjustable voltage divider means coupled between the first side of said first condenser means and the third terminal of said power supply means; a cathode follower whose input end is coupled to the first side of said first condenser means; a second adjustable voltage divider means coupled between the input end of said cathode follower and the third terminal of said power supply means; a second condenser means having one side coupled to the first terminal of said power supply means; a third adjustable voltage divider means coupled between the other side of said second condenser means and the third terminal of said power supply means; a diode whose cathode is coupled to the output end of said cathode follower and whose anode is connected to the other side of said second condenser means; a discharge resistor for said second condenser means connected between the cathode of said diode and the first terminal of said power supply means; an output triode whose anode is connected to the third terminal of said power supply means and whose grid is connected to the other side of said second condenser means; a load resistor connected between the cathodes of said input and output triodes whereby said output triode is normally conductive and said input triode is normally cut off; whereby when a positive-going pulse is coupled to the control grid of said input triode, a negative-going trapezoid-like pulse is obtained at the cathode of said output triode, whose width is adjustable by said first voltage divider, whose amplitude is adjustable by said second voltage divider, and the slope of whose trailing end is adjustable by said third voltage divider.

2. A pulse shaping circuit adapted for use as a sensitivity time control, said circuit comprising; first means having an input end and an output end for generating a negative-going triangular-like pulse at its output end in response to a positive-going triangular-like trigger pulse coupled to its input end, said first means including first adjustment means for adjusting the width of the generated negative-going pulses; second means having an input end and an output end and whose input end is coupled to the output end of said first means for generating a negative-going trapezoid-like pulse for each negative-going pulse input thereto, said second means including second adjustment means for adjusting the amplitude of the generated negative-going trapezoid-like pulses; and third means having an input end and an output end and whose input end is coupled to the output end of said second means, for generating a negative-going trapezoid-like pulse for each input negative-going trapezoid-like pulse and of corresponding amplitude, said third means including third adjustment means for adjusting the slope of the trailing side of the pulses generated by said third means.

3. A pulse shaping circuit as defined in claim 2 wherein each of said adjustment means is a voltage divider.

References Cited in the file of this patent

UNITED STATES PATENTS

| 2,583,173 | Hargens | Jan. 22, 1952 |
| 2,654,840 | Wiegand | Oct. 6, 1953 |